United States Patent [19]
Zeuthen

[11] 3,993,406
[45] Nov. 23, 1976

[54] ELECTROPHOTOGRAPHIC COPYING APPARATUS

[75] Inventor: Karl Gustav Zeuthen, Gentofte, Denmark

[73] Assignee: Zeuthen & Aagaard A/S, Glostrup, Denmark

[22] Filed: Oct. 7, 1975

[21] Appl. No.: 620,346

[30] Foreign Application Priority Data

Oct. 15, 1974 Denmark ............................ 5399/74

[52] U.S. Cl. ...................................... 355/8; 355/50; 355/75; 355/84

[51] Int. Cl.² .................. G03G 15/28; G03B 27/50; G03B 27/62; G03B 27/10

[58] Field of Search ................ 355/8, 50, 51, 75, 84

[56] References Cited

UNITED STATES PATENTS

| | | | |
|---|---|---|---|
| 3,597,074 | 8/1971 | Murgas et al. | 355/75 X |
| 3,737,223 | 6/1973 | Yamamoto | 355/75 X |
| 3,740,133 | 6/1973 | Komori et al. | 355/84 X |
| 3,790,272 | 2/1974 | Knechtel et al. | 355/8 X |
| 3,885,166 | 5/1975 | Moser et al. | 355/75 X |

*Primary Examiner*—George H. Miller, Jr.
*Attorney, Agent, or Firm*—Stevens, Davis, Miller & Mosher

[57] ABSTRACT

An electrophotographic copying apparatus with an original support table arranged on the top of the housing to carry out a reciprocating linear movement out of and back to a home position whereby a copy sheet moved in synchronism with the table is exposed line by line to the original. The table includes a transparent table plate hinged along one longitudinal side edge to a carriage moving along one upper side edge of the housing and guided on a single rail extending longitudinally in the housing on said side, the opposite side of the table plate being pointwise supported relative to the housing so as to be pivotable around the hinge connection with the carriage to provide access to the interior of the apparatus.

4 Claims, 4 Drawing Figures

ELECTROPHOTOGRAPHIC COPYING APPARATUS

The present invention relates to an electrophotographic copying apparatus of the kind in which an original to be copied is supported on a movable table arranged on the top of the housing of the apparatus, which table is at least partially transparent, and by the movement of which out of and back to a home position, a photo-sensitive copy sheet is exposed line by line to the original by means of an optical system, the movement of the table being carried out by means of transmission members transforming the rotary motion of a drive motor into linear reciprocating movement of the table.

As used herein, the expression "table" should be understood so as to comprise the entire movable top portion of the apparatus incorporating a table plate made, for example, of glass or plastics, as well as a support such as a carriage or the like moving on balls, rollers, wheels or rails.

Compared with copying machines of the kind in which the original itself is carried through the machine by a system of conveying rollers, copying machines of the kind in which the original is positioned on a support plate which may be stationary or movable have the advantages that copies may easily be taken from book pages, and that such machines may without difficulties be constructed for automatical reproduction of several copies of the same original without any need of manual handling of the original for each copy to be made.

Moreover, book copying machines of the kind in which relative movement is carried out between the support plate and the optical system, i.e. machines having a movable table, as well as machines having a stationary support plate and a movable optical system, so as to expose the original to a light source line by line may be designated with a consideration to small demands on space and may, thus, be manufactured as table-size machines in contradistinction to book copying machines in which the total area of the original is projected at one time onto the photosensitive copy sheet.

A particular problem in copying machines in which exposure of the original is made line by line is to obtain a sufficient accurate and play-free relative motion between the original and the optical system to satisfy the requirements to sharpness of the exposure and simultaneously obtain a sufficient high speed of the relative movement to keep the duration of the exposure reasonably short.

In machines having a stationary support plate and a movable optical system, these requirements result in the need of a very solid and compact construction of the optical system and the use of relatively complicated control means to secure accuracy in the movement thereof. Furthermore, whether the copy sheet is stationary during exposure or is made to carry out a movement which is synchronzied in a suitable manner to the movement of the original, special demands will have to be fulfilled in such machines by the timing means controlling the copying cycle. Thereby, the manufacture, installation and servicing of such machines are made complicated and expensive to a noticeable degree.

With respect to the relative movement between the original, the optical system and the copy sheet, machines having stationary optics and a movable table are simpler, since the copy sheet may be moved continuously through the processing stations of the machine during the various stages of a copying cycle and synchronous with the movement of the table at least during the stage of exposure.

Moreover, the construction and proportions of the optical system are not made complicated by considerations to the relative movement when the optical system is allowed to be stationary.

In prior art machines of the above mentioned kind having a movable original support table, it has been assumed so far that in order to obtain a sufficiently accurate movement during the stage of exposure, it would be necessary to use a table of a solid, compact construction and relatively great mass as well as means for a safe forced guidance of the table at both sides thereof extending in the direction of movement. In most cases, the result thereof has been a table structure in which the table plate is secured firmly in a rigid and heavy frame structure journalled at opposite longitudinal sides of the machine housing.

It is the object of the invention to provide a simpler and cheaper construction of copying machines of the kind having a movable table.

According to the invention, an electrophotographic copying apparatus is provided, comprising a housing, a table including a transparent table plate for supporting an original to be copied and arranged for reciprocating linear movement on the top of said housing out of and back to a home position, an illumination station including a light source arranged in said housing below said table for exposure of a photo-sensitive copy sheet by said original line by line during said reciprocating movement, a carriage hinged to said table plate along one side thereof and a single longitudinal guide rail arranged stationarily at one side of said housing for guiding the movement of said carriage, and means arranged at said housing for pointwise supporting said table plate at the opposite side relative to the carriage.

As a result of the hinge connection of the table plate at one side only to a carriage which is guided likewise at one side only of the housing, a rigid and heavy frame construction may be dispensed with. Thus, a transparent table plate which may be completely without any frame or be provided with a thin frame of relatively small mass only, made from a metal or plastics or any other suitable material, will suffice. In addition to the advantages of a considerable reduction of the weight and simplification of the manufacture, the hinge connection and guidance of the table at one side only opens the possibility of obtaining a more accurate movement of the table than possible in prior art machines owing to the fact that an advantageous statically defined support of the table is obtained by the combination of said hinge connection and pointwise support of the table along the opposite side.

Moreover, the hinge connection at one side only of the table results in the advantages that access to the interior of the apparatus for service operations may be obtained in a simple manner by pivoting the table plate about the hinge extending along one side edge thereof. Thereby, such access is obtained in a manner comfortable to the service man, which is of particular importance for small compact machines for office use. As far as the daily user of the machine is concerned, it will be possible for him to correct by himself minor errors resulting, for example, from paper jam. Inspection of the interior of the apparatus will easily be possible by pivoting the table plate upwardly, and in many cases skilled servicemen need not be called for, such as necessary in the past, even in case of relatively uncomplicated errors.

Furthermore, a table plate without any frame may extend throughout to, or even beyond the side wall of the machine housing, whereby copies may be made from a book which need not be completely opened, since the part of the book extending outside the table plate will depend in a substantially vertical direction downwardly along the sidewall of the housing. Since it will be possible at the same time to utilize the area of the table plate right to the edge thereof, the book may easily be prevented from any destructive operation, and the page to be copied may be held satisfactorily in a firm contact with the table plate, whereby a good reproduction quality may be obtained right to the back of the book.

In the following the invention will be explained in more detail with reference to the accompanying drawings, on which FIG. 1 is a perspective outside view of an embodiment of a copying apparatus according to the invention;

Figure 1:
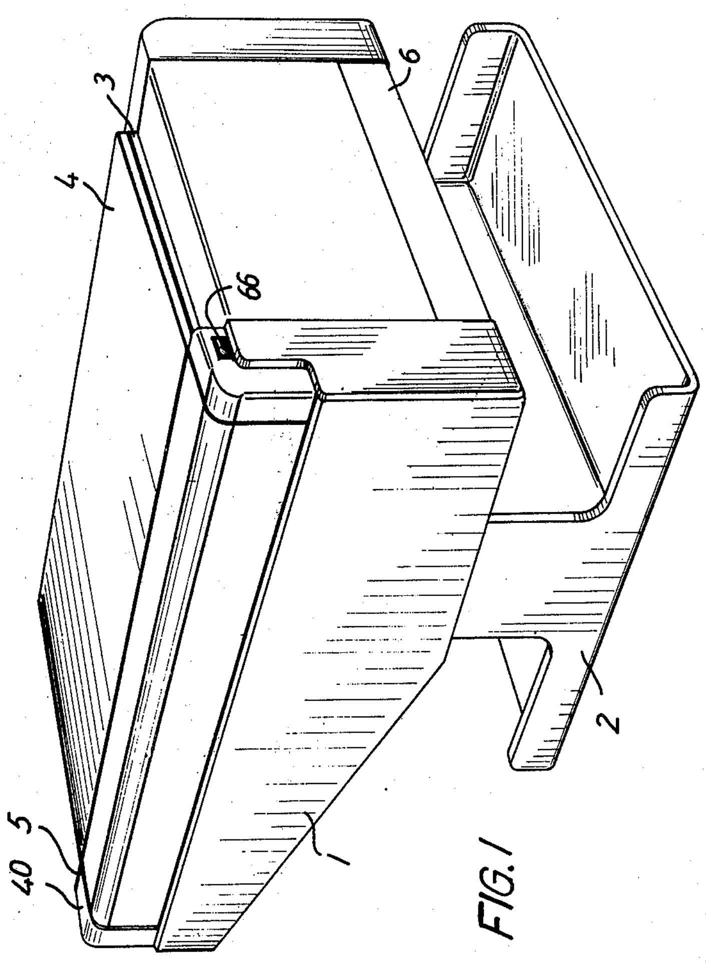

In the drawings, the copying apparatus shown in the perspective view in FIG. 1 is a table-size machine having an elongate, substantially box-shaped housing 1 and a transverse support leg 2 of an inverted T-shaped cross-section. An original to be copied is positioned on a transparent table plate 3 made, for example, of glass and is held by a cover plate 4 of an elastic material.

The exposure of a copy sheet is carried out by moving the table plate 3 with the original postitioned thereon past a stationary optical system in the housing and, to this end, the table plate 3 is connected with a carriage 5 extending along one upper longitudinal side of the housing 1, said carriage being caused by driving means in the housing to carry out linear reciprocating movement in the longitudinal direction of the housing through a stroke, such that the original is scanned throughtout its length line by line by the optical system.

In FIG. 1, reference numberal 6 disignates an outlet slit in one end wall of the housing 1, through which the exposed copy sheet subsequent to development and drying is discharged from the apparatus, for example, to a collecting tray not shown in the drawings.

Figure 2:
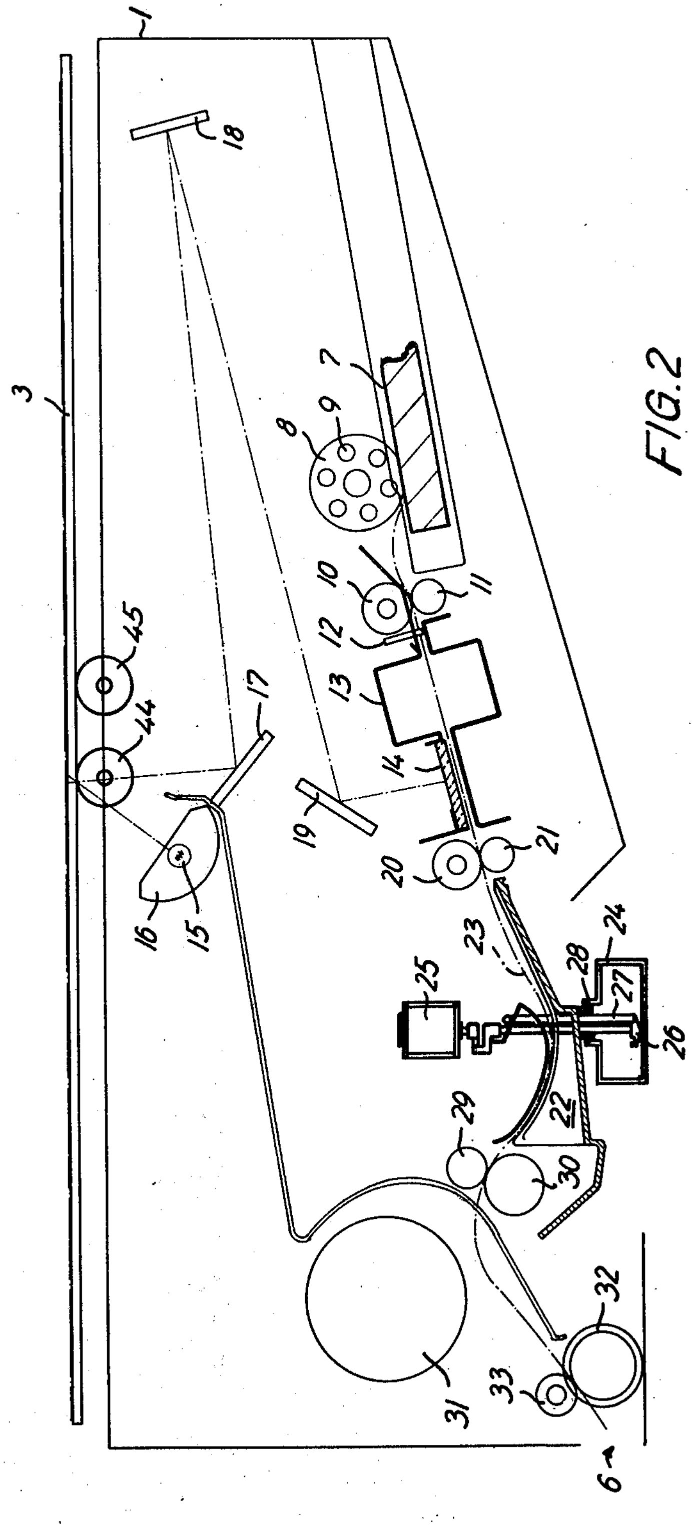
FIG. 2 shows the arrangement of the optical system and the processing stations for a copy sheet in the copying machine shown in FIG. 1.

FIG. 2 illustrates schematically the arrangement of the optical system and the processing station for the copy sheets.

Figure 3:
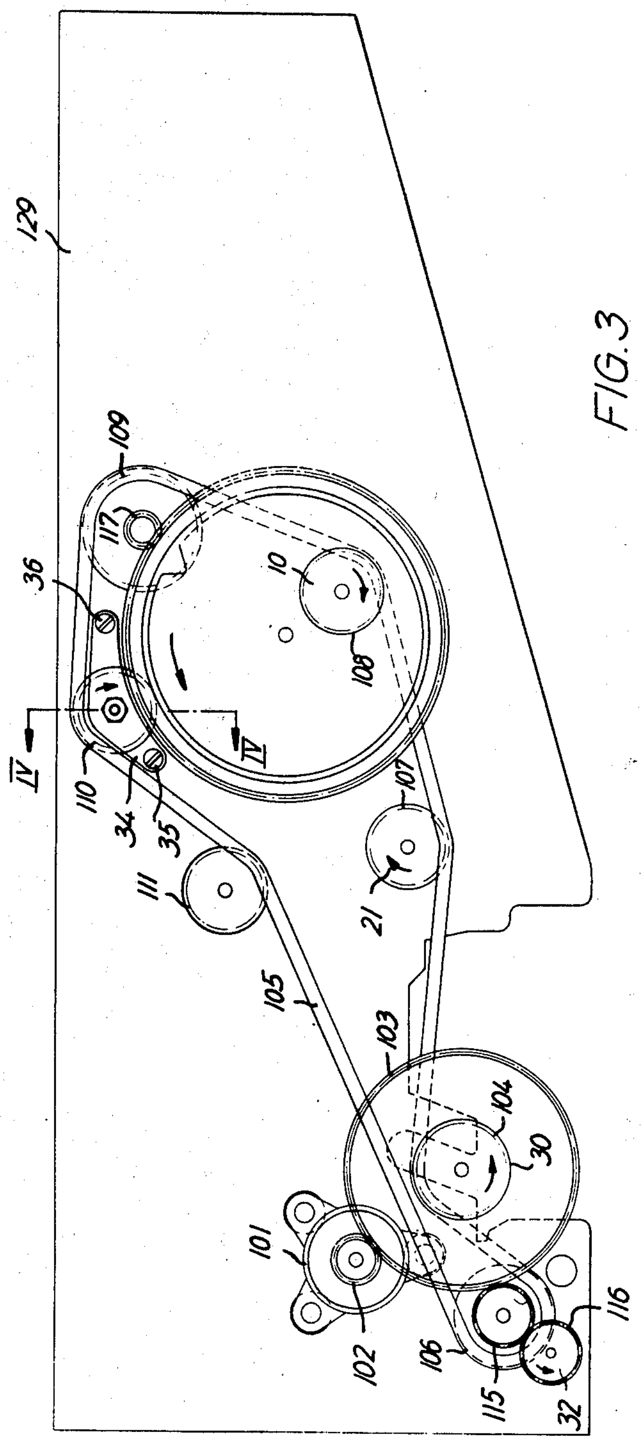
FIG. 3 shows the structure of the drive and transmission means for mechanically movable parts in the copying apparatus.

A copy sheet is taken off from a sheet supply 7 by means of a friction wheel 8 which is provided with pins 9 engaging a set of teeth on a rotating programming disc, shown in FIG. 3, of the kind disclosed in U.S. Pat. No. 3,848,991 to K. G. Zeuthen, whereby the friction wheel 8 is caused at the beginning of a copying cycle to carry out a single complete revolution, as a result of which a copy sheet from sheet supply 7 is conveyed into the space between two co-operating conveying rollers 10 and 11, towards a stop member 12, said conveying rollers being kept apart from each other at that instant.

By means of the programming disc, stop member 12 may be withdrawn from the sheet conveying path and, simultaneously, rollers 10 and 11 are coupled together, whereby the copy sheet is conveyed through a corona device 13 providing the sheet with an electrostatical charge and furtheron past an exposure window 14.

When rotation of the programming disc to turn the friction wheel 8 is started, the movement of table plate 3 is simultaneously initiated, said movement going out from the home position of the table plate shown in FIG. 2 in the direction, for example, to the left.

The programming disc is constructed so as to actuate stop member 12 to be withdrawn from the sheet conveying path when the table plate 3 reaches the extreme position to the left in FIG. 2. In this position of the table plate, an electrical switch, not shown in FIG. 2, will be operated for supplying current to the corona device 13 as well as an exposure lamp 15 extending throughout the width of table plate 3 and illuminating the original positioned thereon in a relatively narrow stripe transverse to the direction of movement of the table by means of a reflector 16.

By means of suitable indications on the table plate 3, the original is positioned thereon so that the end of the original situated to the left in FIG. 2 will pass the light stripe produced by light source 15, 16 during the movement of the table in the direction to the right from the left extreme position simultaneously with the entrance of the leading edge of the copy sheet behind the exposure window 14.

The movement of the table plate 3 from the left to the right takes place synchronously with the movement of the copy sheet after the exposure of window 14 from the right to the left, whereby the copy sheet is exposed line by line to the picture of the original by means of a mirror arrangement 17, 18 and 19 of a construction known per se.

Subsequent to the exposure, the copy sheet is conveyed by a pair of co-operating conveying rollers 20 and 21 onto a developer device 22.

The developer device 22 shown purely schematically is of the construction disclosed in U.S. Pat. No. 3,905,696 to K. G. Zeuthen and comprises a toner trough 23 and a toner bottle 24 connected disengageably therewith, said bottle being disigned to be arranged on a supporting shelf not shown in the bottom of the housing 1, the contents of liquid toner in the bottle being supplied by means of a propeller pump 26 driven by a motor 25 to the toner trough 23 through a supply tube 27, whereafter the liquid toner subsequent to circulation through the toner trough is collected in the bottom thereof and returned into the bottle 24 through a connecting stub 28 formed in the bottom of the toner trough and projecting down into an opening in the bottle 23, through which also the drive shaft for propeller pump 26 as well as the supply tube 27 project down into the bottle.

Subsequent to the development, the wet copy sheet is conveyed by a new pair of co-operating conveying rollers 29 and 30 past a drying device in the form of a hot-air blower, shown purely schematically, and furtheron between another pair of co-operating conveying rollers 32 and 33 to outlet slit 6, shown in FIG. 1.

FIG. 3 shows schematically the essential part of the driving members for the movable parts of the apparatus.

The rotary motion of a drive motor 101 which may be coupled directly to hot-air blower 31, and the actuation of which may be controlled by a start and repeater mechanism of the kind disclosed in co-pending patent application Ser. No. 622,742, filed in the U.S. Pat. Office on Oct. 15, 1975 is transmitted by a gear 102 coupled directly with the motor to a gear 103 which is coupled together with a sprocket wheel 104 and therefrom to a transmission chain 105 engaging a number of sprocket wheels 106 to 111. Sprocket wheels 104, 106, 107 and 108 constitute drive wheels for the conveying rollers 30, 32, 21 and 10, respectively, shown in FIG. 2, roller 32 being driven by sprocket wheel 106 through gears 115 and 116. Sprocket wheel 109 serves through a gear 117 as a drive wheel for the above mentioned rotating programming disc which is designated by 118, and sprocket wheel 110 serves as a drive wheel for transmission members to be discribed in the following, by which the movement is transferred to the table plate 3, while sprocket wheel 111 serves to straighten the chain 105.

The driving members shown in FIG. 3 are mounted at one longitudinal side of the apparatus, the conveying rollers and the sprocket wheels and gears as well as the programming disc being journalled in bearings mounted in a stationary vertical supporting wall 129 except, however, the sprocket wheel 110 which is journalled in a bearing mounted in a separate supporting frame secured by screws 35 and 36 to wall 129.

Figure 4:
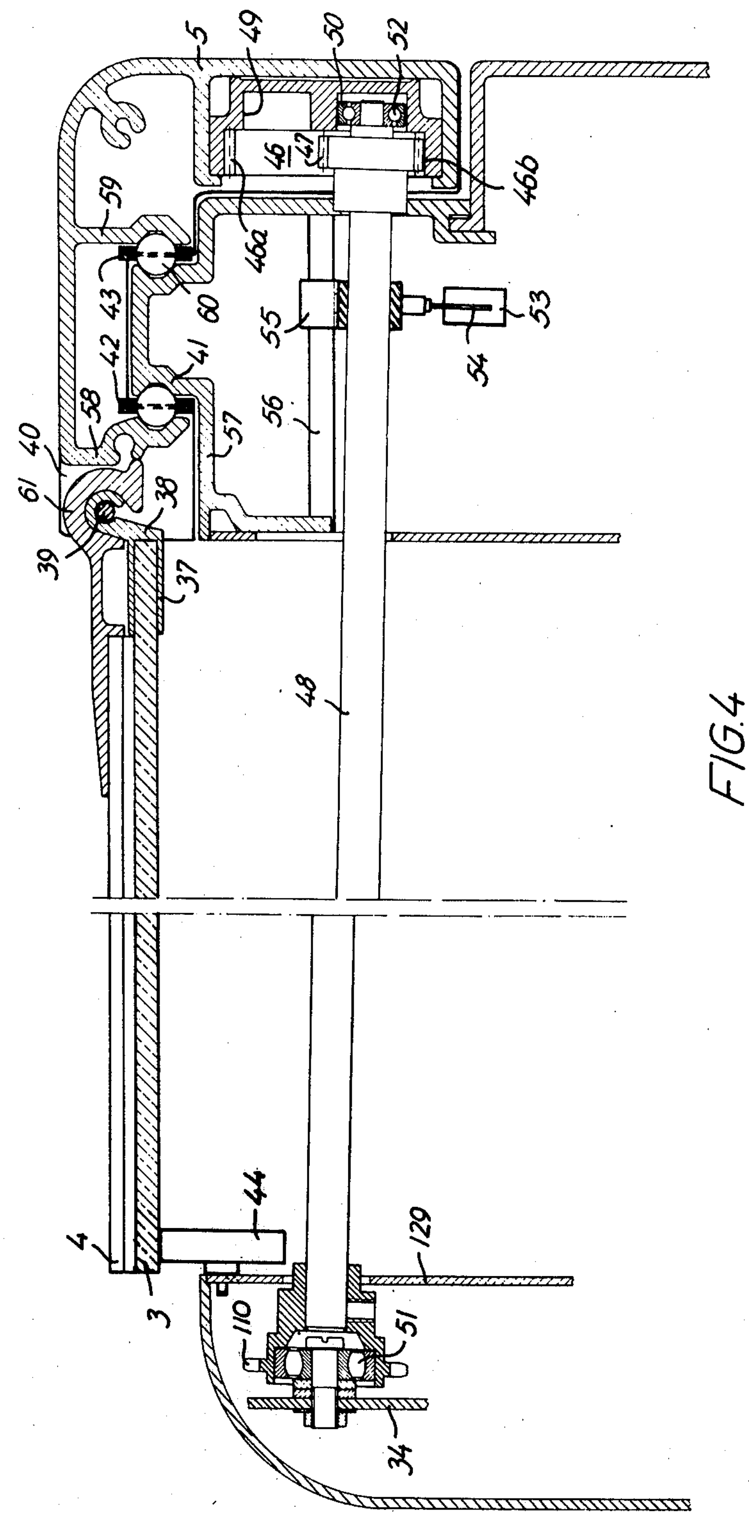
FIG. 4 is a cross-sectional view along the line IV—IV in FIG. 3, to illustrate the support of a movable original table.

In the cross-sectional view in FIG. 4 of the upper part of the copying apparatus along the line IV—IV in FIG. 3, only one of the driving members of FIG. 3, namely sprocket wheel 110, is shown.

Other transmission members shown in FIG. 4 for transforming the rotatry motion of sprocket wheel 110 into the desired reciprocating movement of the table plate 3 comprise a tooth rim 46 mounted on carriage 5 with which the pinion 45 secured at one end of a shaft 48 which is connected in the opposite end with sprocket wheel 110 is kept in continuous engagement by means of a guiding wheel 50 mounted rotatably on the extreme end of shaft 48 outside pinion 47, said guide wheel 50 being caused to follow an elongate endless guide track 49 formed in tooth rim 46. However, the detailed construction of the transmission members is disclosed in co-pending patent application Ser. No. 620,254, filed in the U.S. Pat. Office on Oct. 7, 1975, and shall, therefore, not be dealt with herein.

As shown in FIG. 4, table plate 3 is connected along one longitudinal side edge with a hinge blade 37 which contacts the table plate on both surfaces and has a bent flange portion 38 which partly encloses a hinge shaft 39 extending throughout the length of the table plate, the ends of said hinge shaft being secured in a manner not shown in detail in wall members 40 secured to the carriage 5, such as best seen in FIG. 1.

The movable carriage 5 and the table plate 3 connected therewith through wall members 40 and hinge connecting members 37, 38 and 39 are supported on a longitudinal rail 41 extending throughout the length of housing 1 on the upper side of a stationary supporting section 57 of the housing 1.

As illustrated in FIG. 4, carriage 5 has, in the embodiment shown, a substantially L-shaped cross-section and is formed on the side facing housing 1, for the purpose of engagement with guide rail 41, with two internally depending longitudinal flange portions 58 and 59 extending along opposite longitudinal sides of guide rail 41. In the surfaces facing each other of guide rail 41 and each of said depending flange portions 58 and 59, respectively, rectilinear longitudinal cuts of a substantially V-shaped cross-section are formed for the accomodation of ball guides 42 and 43 with balls 60.

The carriage 5 together with the internally depending flange portion 58 and 59 may suitably be cast in one piece from a plastics, such as nylon, to obtain a reduction of weight of the movable parts of the apparatus.

At the opposite longitudinal side edge relative to carriage 5, the table plate 3 is supported by two guide wheels 44 and 45 which by means of suitable bearings are mounted to the freely rotatable relative to the supporting wall 129 with a relatively small mutual separation.

By means of the supporting arrangement for the table plate 3, the support thereof is made considerably simpler and cheaper relative to prior art copying machines having a movable table. Since an entirely transparent table plate without any frame structure will be sufficient, the additional advantage is obtained of a reduction of the total weight of the movable parts of the apparatus is obtained.

Furthermore, the hinge connection of table plate 3 at one longitudinal side thereof only, wherein the longitudinal hinge shaft 39 may also be utilized as shown in FIG. 4 for hinging the flexible cover plate 4 along one longitudinal side thereof by means of a hinge blade 61 opens the possiblility of obtaining a very easy access to the interior of the copying apparatus in case of service operations by simply opening the table plate 3 and cover plate 4 by pivoting around hinge shaft 39.

Moreover, a more accurate table movement may be obtained in that an advantageous statically defined support of the table plate will result from the pointwise support of table plate 3 at the longiutudinal side opposite to the hinge connection by means of wheels 44 and 45.

As illustrated in FIG. 1 and also indicated in FIG. 4, ball guides 42 and 43 are kept in position between rail 41 and depending flange portions 58 and 59 of carriage 5 in that the intermediate space between rail 41 and each of said flange portions in which the balls are positioned is closed at the end, wall members 40 at the ends of carriage 5 on one hand and by cover plates for rail 41, such as shown at 66 in FIG. 1 on the other hand.

As readily apparent, the ball guides 42 and 43 must have a length which is shorter than the minimum distance between cover plate 66 at one end of housing 1 and the particular wall member 40 which in the extreme position of carriage 5, wherein the carriage extends outside the particular end of the housing, is situated between the end of the housing, said length being, in practice, somewhat shorter than half the length of carriage 5.

The hinge connection of the original support table at one side only suggested by the invention is in no way limited to the embodiment described and shown herein and may without difficulties also be utilized in copying machines with other kinds of transmitting equipment between the drivemotor and the movable table and a different construction of the further parts which are not associated with the table support.

What is claimed is:

1. An electorphotographic copying apparatus comprising a housing, a table including a transparent table plate for supporting an original to be copied and arranged for reciporocating linear movement on the top of said housing out of and back to a home position, an illumination station including a light source arranged in said housing below said table for exposure of a photosensitive copy sheet by said original line by line during said reciprocating movement, a carriage hinged to said table plate along one side thereof and a single longitudinal guide rail arranged stationarily at one side of said housing for guiding the movement of said carriage, and means arranged at said housing for pointwise supporting said table plate at the opposite side relative to the carriage.

2. An electrophotographic copying apparatus as claimed in claim 1, wherein said carriage has a substantially L-shaped cross section and is provided on the side facing said housing with two longitudinal, projecting flange portions engaging opposite side faces of said guide rail, each of said opposite side faces and the opposing side face of the adjacent flange portion being formed to accommodate a number of guide balls mounted in a common longitudinal flat ball holder betwen said guide rail and said adjacent flange portion.

3. An electrophotographic copying apparatus as claimed in claim 1, wherein said table plate is connected along said one side with hinge blade overlapping edge portions of the top and bottom surfaces of the table plate and being formed with a bent longitudinal flange portion journalled on a hinge shaft connected with said carriage.

4. An electrophotographic copying apparatus as claimed in claim 3, further comprising a cover plate of an elastically resilient material for securing the position of an original on said table plate, said cover plate being hinged to the same hinge shaft as said table plate.

* * * * *